United States Patent [19]

Oshiage et al.

[11] Patent Number: 5,019,799
[45] Date of Patent: May 28, 1991

[54] ELECTRONIC DEVICE WITH SELF-MONITOR FOR AN AUTOMOTIVE VEHICLE

[75] Inventors: Katsunori Oshiage, Yokosuka; Akio Hosaka, Akito Yamamoto, both of Yokohama, all of Japan

[73] Assignee: Nissan Motor Company, Limited, Yokohama, Japan

[21] Appl. No.: 38,442

[22] Filed: Apr. 15, 1987

Related U.S. Application Data

[63] Continuation of Ser. No. 925,528, Oct. 28, 1986, abandoned, which is a continuation of Ser. No. 836,216, Feb. 28, 1986, abandoned, which is a continuation of Ser. No. 405,426, Aug. 5, 1982, abandoned.

[30] Foreign Application Priority Data

Aug. 6, 1981 [JP] Japan .............................. 56-116150[U]
Aug. 6, 1981 [JP] Japan ................................ 56-122415

[51] Int. Cl.$^5$ .............................................. B60Q 1/00
[52] U.S. Cl. ..................................... 340/438; 340/439
[58] Field of Search ................... 73/117.3; 371/16, 29; 364/424, 426, 551, 431.04; 340/438, 439

[56] References Cited

U.S. PATENT DOCUMENTS 3,916,178 10/1975 Greenwald ........................ 371/29 X
3,953,717 4/1976 Rottier et al. ..................... 371/29 X
4,271,402 6/1981 Kastura et al. .................... 340/52 F
4,339,807 7/1983 Hosaka ............................. 123/417 X
4,402,217 9/1983 Higashiyama .
4,442,424 4/1984 Shirasaki et al. .................. 340/52 F
4,443,784 4/1984 Franzen et al. .................... 340/52 F 4,497,057 1/1985 Kato et al. .

FOREIGN PATENT DOCUMENTS 2929532 2/1981 Fed. Rep. of Germany .
56-141534 11/1981 Japan .
2035633 7/1979 United Kingdom .
2048532 5/1980 United Kingdom .............. 340/52 F
2044485 10/1980 United Kingdom .
2046964 10/1980 United Kingdom .
2052801 1/1981 United Kingdom .

Primary Examiner—Ulysses Weldon
Attorney, Agent, or Firm—Foley & Lardner

[57] ABSTRACT

A self-monitoring system for an automotive electronic control system such as an engine control system, an electronic anti-skid control system or electronic automatic transmission control system is adapted to check each segment of the electronic control system in order to detect faulty segments. To detect faulty segments, the self-monitor system checks inputs and outputs of the electronic control system. The checked data is stored in a memory which is not erased when the power supply is turned off. The self-monitoring system is associated with another automotive microcomputer which includes a display unit. The other automotive microcomputer is adapted to display the results of the checking operation of the self-monitoring system in response to a display request manually inputted from a manual unit to display identification of the fault segment and/or error condition thereof. The monitor can also be associated with a fault indicator, such as an LED, which is responsive to detection of error in any of the segments to turn on.

20 Claims, 11 Drawing Sheets

| ITEM - 1<br>(COOLANT TEMPERATURE SENSOR) | | | ITEM - 2<br>(CRANK ANGLE SENSOR) | | | ITEM - 3<br>(CRANK ANGLE SENSOR) | |
|---|---|---|---|---|---|---|---|
| ERROR<br>CONDITION | MODE - 1 | MODE - 2 | ERROR<br>CONDITION | MODE - 1 | MODE - 2 | ERROR<br>CONDITION | MODE - 1 |
| | OCCURRENCE | OCCURRENCE | | OCCURRENCE | OCCURRENCE | | OCCURRENCE |
| 7 | 6 5 4 | 3 2 1 | | | | | |
| 1451 | 1452 | 1453 | | | | | |

ERROR CONDITION COUNT

MODE - 1 COUNT

MODE - 2 COUNT

ELECTRONIC DEVICE WITH SELF-MONITOR FOR AN AUTOMOTIVE VEHICLE

This application is a continuation of application Ser. No. 925,528, filed Oct. 28, 1986 now abandoned; which is a continuation of application Ser. No. 836,216, filed Feb. 28, 1986, now abandoned; which is a continuation of application Ser. No. 405,426, filed Aug. 5, 1982, now abandoned.

BACKGROUND OF THE INVENTION

The present invention relates generally to an electronic device for an automotive vehicle, which device includes an electronic control device, various digital indicators, various vehicle condition sensors and so forth. More particularly, the invention relates to the electronic device with a self-monitoring capability for checking input and output conditions of respective electronic elements or segments.

Recently, it has become popular to employ a microcomputer in automotive vehicles to control vehicle operations such as engine control, anti-skid control, or to display various vehicle information such as warnings of abnormal conditions of vehicle devices. On the other hand, the automotive vehicle contains various devices such as the ignition system and the audio system which act as sources of noise which can possibly cause microcomputer failure. Furthermore, due to rather hard vibrations applied to the vehicle, the microcomputer itself or sensors serving as input devices can produce erroneous signals.

In the case of engine control, failure of the microcomputer operation influences fuel economy, engine performance and/or drivability and so on. Furthermore, in the worst case, failure of the microcomputer may cause uncontrollable engine operation resulting not only in damaging of the engine but also in serious danger to vehicle occupants.

In order to prevent the automotive electronic device from malfunctioning, it is, therefore, necessary to sequentially or continuously check each of the functions of the microcomputer to detect failure or error therein.

Conventionally, there are various self-monitoring automotive electronic devices. For example, British Prepublication No. 2,035,633, published on June 18, 1980 discloses a malfunction-preventing system for a microcomputer system which detects an abnormal condition in the program execution to produce an alarm or reset signal to automatically restart the computer. The malfunction-preventing system is applicable to automotive engine control wherein the microcomputer is capable of returning to normal operation upon detecting a malfunction of a program for fuel parameter calculation, thereby keeping the automotive engine control in order. In addition, British Prepublication 2,046,964, published on Nov. 19, 1980 and U.S. Pat. No. 4,339,801, issued on July 13, 1982, disclose an automatic control system for an automotive vehicle employing a microcomputer. In the control system, various check programs for checking each functional areas of the microcomputer and sensors for inputting control parameters have been provided to detect fault in any of these functional areas.

Furthermore, an external check system for factory use has been disclosed in U.S. Pat. No. 4,402,217. In this patent there is disclosed an electronic engine control system with a checking unit for sensors and actuators. The checking unit utilizes the microcomputer as a control unit and is releasably connected to the latter. The system comprises an engine assembly including an air intake, a throttle valve, an intake manifold, exhaust system and a combustion chamber, a sensor means determining an engine operating parameter and generating a sensor signal indicative of the determined engine operating parameter, a control means processing the sensor signal and generating a control signal corresponding to the engine operating parameter represented by the sensor signal, an actuator responsive to said control signal to control the ratio of energized period and deenergized period depending on the duty cycle of said control signal, a check unit cooperative with the control means for generating a command which causes the control means to affect the checking operation, the check unit including a selector means for selecting an item to be checked, which selector means is manually operable to cause the control means to affect the checking operation for the selected item, and a display means incorporated in the check unit for displaying the result of the checking operation.

The present invention is to improve the convenience of checking of these previously developed automotive microcomputer monitor systems. One particular feature of the present invention is that the self-monitoring system for the automotive electronic control system is associated with another microcomputer system with a display unit for displaying the results of the check operation.

SUMMARY OF THE INVENTION

Therefore, it is an object of the present invention to provide a self-monitoring system for an automotive electronic control system, associated with another microcomputer system including a display unit in order to conveniently indicate faulty segments and errant conditions on the display.

In order to accomplish the above-mentioned and other objects, there is provided a self-monitoring system for an automotive electronic control system such as an engine control system, an electronic anti-skid control system or electronic automatic transmission control system, which self-monitoring system is adapted to check each segment of the electronic control system in order to detect faulty segments. To detect faulty segments, the self-monitoring system checks inputs and outputs of the electronic control system. The checked data is stored in a memory which is not erased when the power supply is turned off. The self-monitoring system is associated with another automotive microcomputer which includes a display unit. The other automotive microcomputer is adapted to display the results of the checking of the self-monitoring system in response to a display request manually inputted from a manual unit to identify the faulty segments and/or errant conditions. The self-monitor is also associated with a fault indicator which is responsive to detection of error in any of the segments to turn on.

DETAILED DESCRIPTION OF THE PREFERRED EMBODIMENTS

Figure 1:
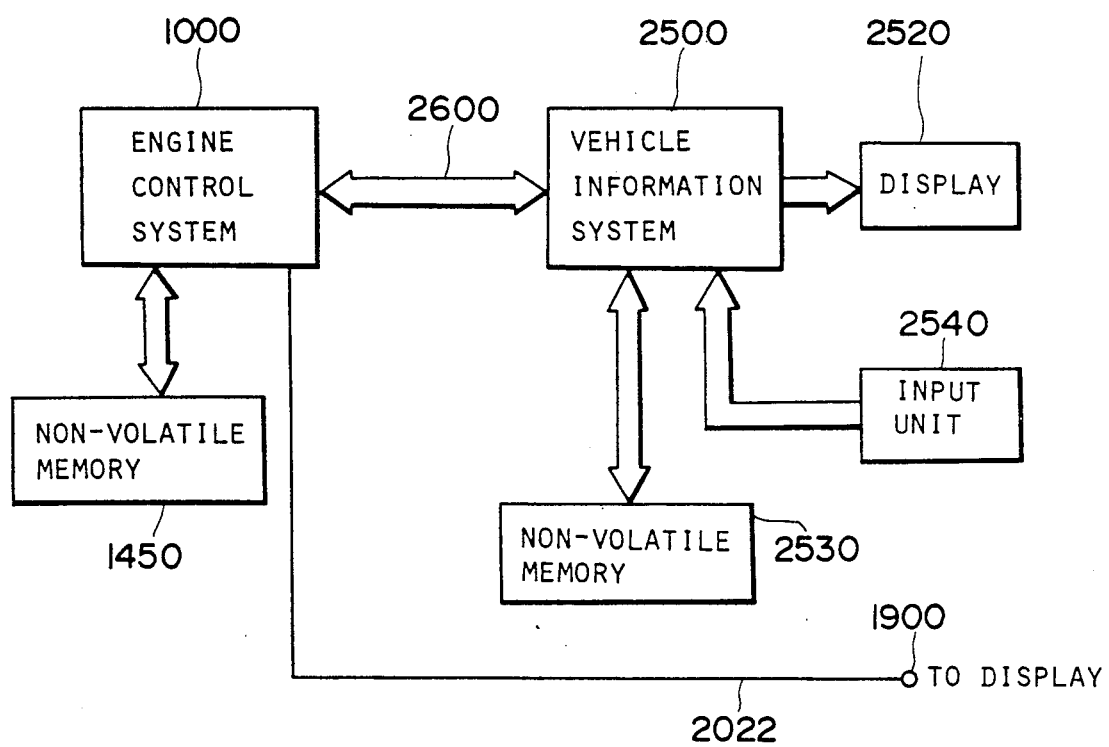
FIG. 1 is a schematic block diagram of the first embodiment of the self-monitoring system according to the present invention.

In the embodiment shown in FIG. 1, the electronic device generally comprises an engine control system 1000 and an associated vehicle information system 2500. The engine control system 1000 includes various sensors and detectors such as an engine speed sensor, an air flow meter, and various temperature sensors, for providing control parameters, a control unit and actuators for controlling various engine operations such as fuel metering, idle air flow, and spark ignition timing. The engine control system further includes a fault monitor for detecting faults in the control system. The fault monitor checks the operation of the control unit and the inputs from the sensors. The results of the check operation in the fault monitor are conducted to a non-volatile memory 1450 which is associated with the engine control system 1000. The check operation results are also fed to a display 1900 for control system fault indication through a data line 2022. On the other hand, the vehicle information system 2500 in the shown embodiment is adapted to compute travelling distance, travelling time, average vehicle speed and so on in order to display information related to the current vehicle trip. The vehicle information system 2500 is associated with an external input unit 2540 such as keyboard and a display 2520 for information display. The vehicle information system 2500 is further associated with a non-volatile memory 2530 for storing the computed results.

Figure 2:
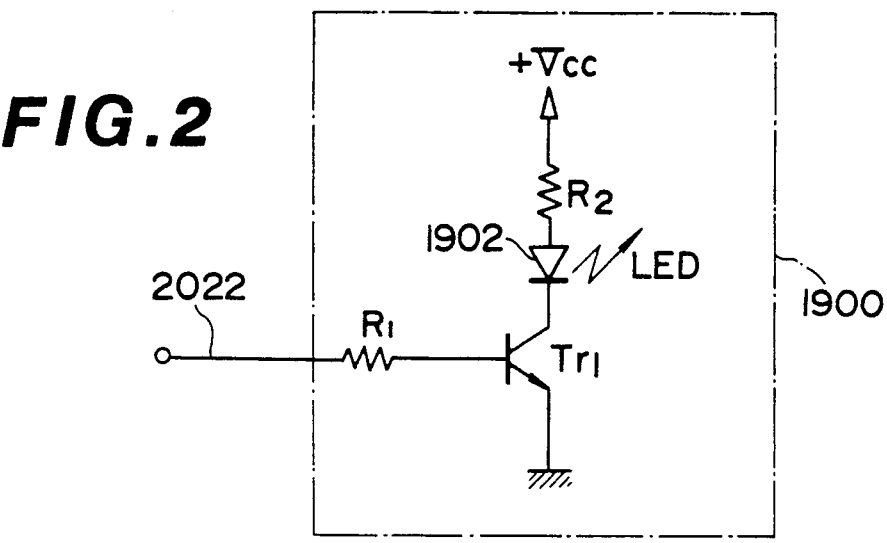
FIGS. 2 to 4 show respectively indicators to be applied in the self-monitoring system of FIG. 1.
Figure 3:
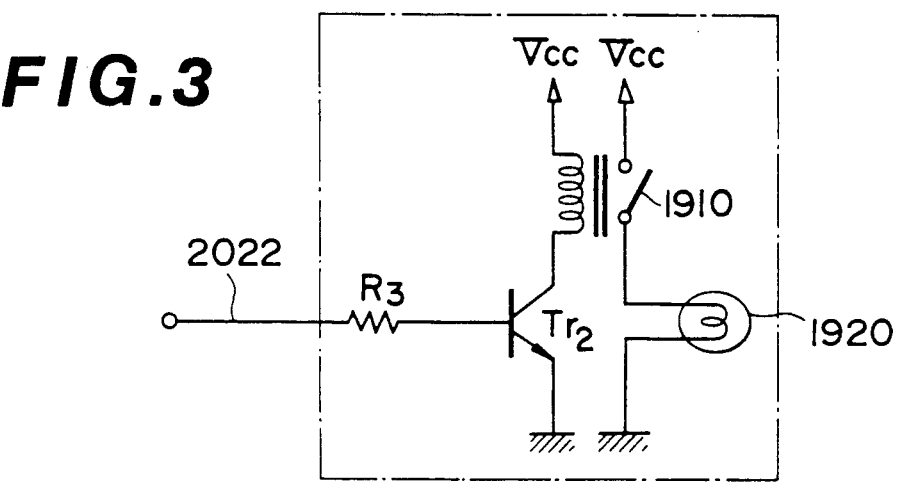
Figure 4:
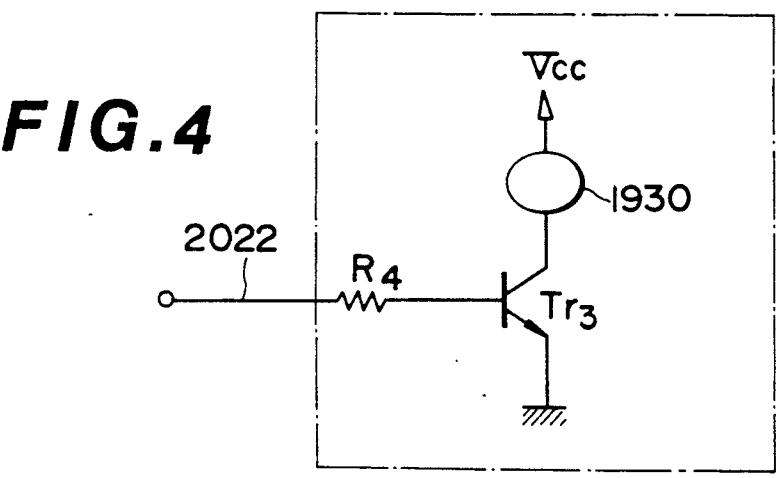

In the shown embodiment, the non-volatile memories may be Metal Nitride Oxide Silicon (MNOS), Erasable Programable ROM (EPROM) or CMOS. In addition, the display can comprise various elements for indicating or warning when the system or sensors malfunctions. FIGS. 2 to 4 show examples of the display 1900.

In FIG. 2, a light-emitting diode 1902 is used as an indicator in the display. The LED 1902 is connected to the fault monitor in the engine control system 1000 through the data line 2022 and via a resistor $R_1$ and a transistor $Tr_1$. The transistor $Tr_1$ is turned on in response to a fault signal which is produced by the fault monitor when the control unit or a sensor malfunctions. By turning on transistor $Tr_1$, power $V_{cc}$ is applied to the LED 1902 which emits an indication light. FIG. 3 shows another example in which an indicator lamp 1920, a relay switch 1910 and a transistor $Tr_2$ constitute the display 1900. As in the foregoing example, the transistor $Tr_2$ is connected to the fault monitor in the engine control system 1000 via the data line 2022 and a resistor $R_3$. The transistor is activated by the fault signal. This way, the relay switch 1910 is activated to apply power $V_{cc}$ to the lamp 1920. The other example is shown in FIG. 4, in which a buzzer 1930 is used for fault indication. The buzzer 1930 is activated in conjunction with the transistor $Tr_3$ which is responsive to the fault signal from the fault monitor.

Returning to FIG. 1, the engine control system 1000 and the vehicle information system 2500 are connected to each other via a data transmission line 2600. The vehicle information system 2500 produces a read command when a read request is inputted to the input unit. The read command is fed to the engine control system through the data transmission line 2600 to read the data out of the non-volatile memory 1450. The read request is inputted to the input unit when the display 1900 indicates an error in the engine control system 1000.

The data from the non-volatile memory 1450 is transferred to the vehicle information system 2500 via the fault monitor in the engine control system 1000 and the data transmission line 2600. The vehicle information system 2500 distinguishes which sensor or element of the control unit in the engine control system is malfunctioning. Based on the detection of the faulty element or sensor, the vehicle information system 2500 feeds a fault display signal to the display 2520. Therefore, according to the identification by the fault display signal and depending on the fault display signal value, the display 2520 indicates the faulty sensor or element and the degree of error therein.

It should be appreciated that the fault monitor outputs data in response to the read command and holds the check program results until the next read command is received. In addition, the fault monitor connected in this manner to the vehicle information system according to the present invention is applicable not only for the foregoing engine control system but also for electronic control systems for automatic power transmission or for anti-skid control and so forth.

Figure 5:
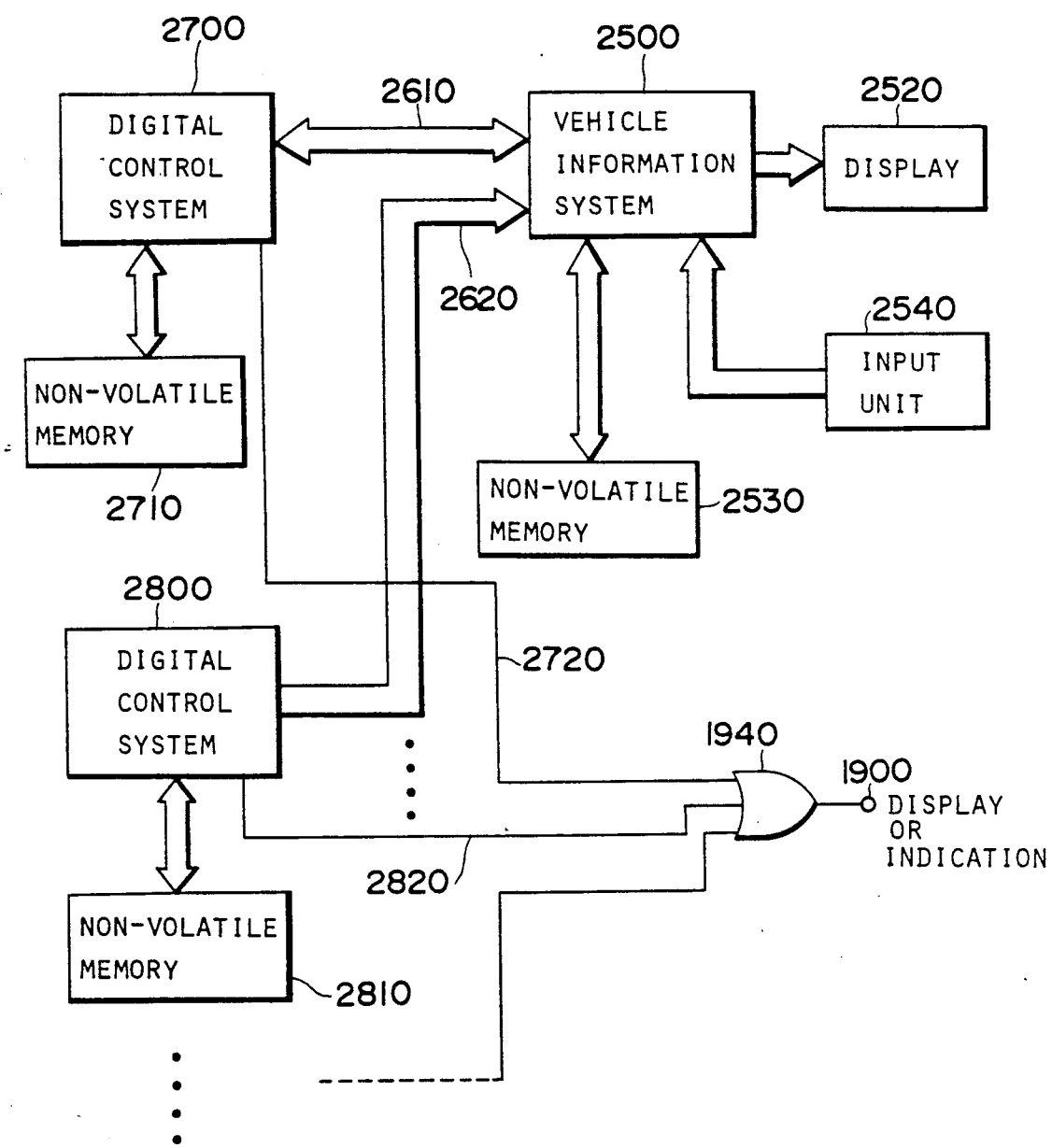
FIG. 5 is a schematic block diagram of the second embodiment of the self-monitoring system of the present invention.

Referring to FIG. 5, there is shown a second embodiment in which a plurality of digital or electronic control systems 2700, 2800 . . . are connected to the vehicle information system 2500. As shown in FIG. 5, respective digital control systems 2700, 2800 . . . are connected to the vehicle information system 2500 via respective data transmission lines 2610, 2620 . . . and have non-volatile memories 2710, 2810 . . . In addition, the digital control systems 2700, 2800 . . . are respectively connected to a fault display or indication 1900 via data lines 2720, 2820 . . . and via an OR gate 1940.

Similarly to the foregoing first embodiment, each of the digital control systems 2700, 2800 . . . includes a fault monitor for detecting faults in one of the elements or segments thereof and producing a fault indication signal to be fed to the fault display 1900 via the OR gate 1940. The fault monitor also feeds check data to the non-volatile memory 2710, 2810 . . . for storage. This way, the fault display 1900 indicates that some part of one of the digital control systems is malfunctioning. The input unit 2540 is adapted to input a request for display on the display 2520 of information about faults in the digital control system in the manner similar to the foregoing first embodiment.

Here, the electronic control system of the present invention will be illustrated in greater detail with reference to FIGS. 6 and 7. In FIG. 6, there is illustrated the electronic engine control system, so-called Electronic Concentrated Control System (ECCS) for a 6-cylinder reciprocating engine known as Datsun L-type engine. In the shown control system, fuel injection, spark ignition timing, exhaust gas recirculation rate and engine idling speed are all controlled. Fuel pressure is controlled by controlling fuel pump operation.

Figure 6A:
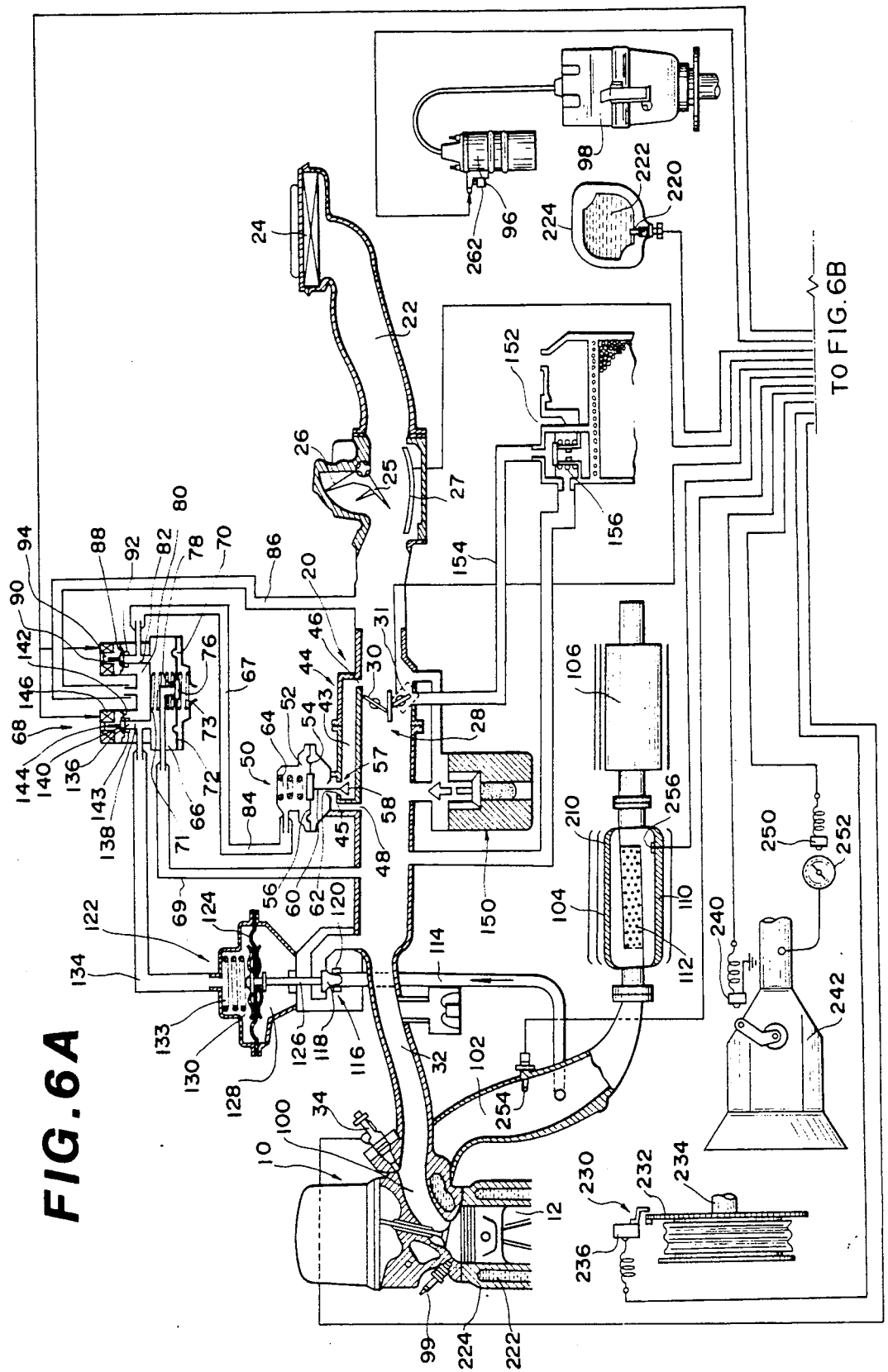
FIGS. 6A and 6B are overall illustrations of an electronic engine control system associated with a vehicle information system including another microcomputer.

In FIG. 6A, each of the engine cylinders 12 of an internal combustion engine 10 communicates with an air induction system generally referred to by reference numeral 20. The air induction system 20 comprises an air intake duct 22 with an air cleaner 24 for cleaning atmospheric air, an air flow meter 26 provided downstream of the air intake duct 22 to measure the amount of intake air flowing therethrough, a throttle chamber 28 in which is disposed a throttle valve 30 cooperatively coupled with an accelerator pedal (not shown) so as to adjust the flow of intake air, and an intake manifold 32. The air flow meter 26 comprises a flap member 25 and a rheostat 27. The flap member 25 is pivotably supported in the air intake passage 20 so that its angular position varies according to the air flow rate. Specifically, the flap member 25 rotates clockwise in FIG. 6 as the air flow rate increases. The rheostat 27 opposes the flap member 25 and generates an analog signal with a voltage level proportional to the intake air flow rate. The rheostat 27 is connected to an electrical power source and its resistance value is variable in correspondence to variation of the angular position of the flap member 25 depending in turn on variation of the air flow rate.

A throttle angle sensor 31 is associated with the throttle valve 30. The throttle angle sensor 31 comprises a full throttle switch which is turned on when the throttle valve is open beyond a given open angle and an idle switch which is turned on when the throttle valve is open less than a minimum value.

Fuel injection through the fuel injectors 34 is controlled by an electromagnetic actuator (not shown) incorporated in each fuel injector. The actuator is electrically operated by the fuel injection control system which determines fuel injection quantity, fuel injection timing and so on in correspondence to engine operating conditions determined on the basis of measured engine operation parameters such as engine load, engine speed and so on. It should be noted that, although the fuel injector 34 is disposed in the intake manifold 32 in the shown embodiment, it is possible to locate it in the combustion chamber 12 in a per se well known manner.

An idle air intake passage 44 is provided in the air induction system 20. One end 46 of the idle air intake passage 44 opens between the air flow meter 26 and the throttle valve 30 and the other end 48 opens downstream of the throttle valve 30, near the intake manifold 32. Thus the idle air intake passage 44 bypasses the throttle valve 30 and connects the upstream side of the throttle valve 30 to the intake manifold 32. An idle air control valve, generally referred to by reference numeral 50, is provided in the idle air intake passage 44. The idle air control valve 50 generally comprises two chambers 52 and 54 separated by a diaphragm 56. The idle air control valve 50 includes a poppet valve 58 disposed within a port 57 in a manner that it is movable between two positions, one opening the valve to establish the communication between the respective upstream and downstream portions 43 and 45 of the idle air intake passage 44 and the other closing the valve to block the communication therebetween. The idle air intake passage 44 is thus separated by the idle air control valve 50 into two portions 43 and 45 respectively located upstream and downstream of the port 57 of the idle air control valve. The poppet valve 58 has a stem 60 which is secured to the diaphragm 56 so as to cooperatively move therewith. The diaphragm 56 is biased downwards in the drawing, so as to release the poppet valve 58 from a valve seat 62, by a helical compression coil spring 64 disposed within the chamber 52 of the valve means 50. Thereby, the idle air control valve 50 is normally opened, and normally communicates the portions 43 and 45 of the idle air intake passage 44 to one another, via its valve port 57.

The chamber 54 of the idle control valve 50 is open to the atmosphere. On the other hand, the chamber 52 of the idle air control valve 50 communicates through a vacuum passage 67 with a pressure regulating valve 68 serving as the control vacuum source. The pressure regulating valve 68 is separated generally into two chambers 66 and 70 by a diaphragm 72. The chamber 66 of the pressure regulating valve 68 also communicates with the downstream side of the throttle valve 30 through the vacuum passage 69 so as to reflect the level of the intake vacuum. The chamber 70 is open to the atmosphere in a per se well known manner. To the diaphragm 72 is secured a valve member 76 which opposes a valve seat 78 provided at the end of the passage 69. In the chambers 66 and 70 there are respectively disposed helical compression springs 71 and 73. The position at which the springs 71 and 73 are generally of equal spring pressure is referred to as the neutral position of the diaphragm 72. It will be noted that the chamber 66 can also be connected with a exhaust-gas recirculation (EGR) rate control valve 116 which recirculates a fraction of the exhaust gas flowing through an exhaust gas passage and exhaust gas recirculation passage to the intake manifold 32.

The diaphragm 72 is moved upwards or downwards by the change of the balance between the vacuum in the chamber 66 and the atmospheric pressure introduced into the chamber 70. By this movement of the diaphragm 72, the valve member 76 is moved toward and away from the valve seat 78.

Another chamber 80 is also defined in the control valve 68, which chamber 80 communicates with the chamber 66 through a passage 82. The passage 82 is connected with the chamber 52 of the idle air control valve 50 through a control vacuum passage 84. On the other hand, the chamber 80 also communicates with the air intake passage 20 upstream of the throttle valve 30 through a passage 86 so as to be exposed to atmospheric air. The chamber 80 is partitioned by a diaphragm 88 on which a magnetic valve member 90 is secured. The magnetic valve member 90 opposes a valve seat 92 formed at the end of the passage 82. Also, the magnetic valve member 90 opposes an electromagnetic actuator 94, the duty cycle of which is controlled by a control pulse signal generated by a controller 100. Depending on the amount of atmospheric air introduced into the passage 82 from the chamber 80, which is determined by the duty cycle of the electromagnetic actuator 94 which in turn is determined by the duty cycle of the control pulse signal, the control vacuum for controlling the opening degree of the valve member 58 of the idle air control valve 50 is regulated and supplied via the control vacuum passage 67.

Spark ignition plugs 99 are inserted into respective engine cylinders 12 to effect spark ignition at a controlled timing. Each ignition plug 99 is connected to a distributor 98 which receives high voltage power from an ignition coil 96. The distributor 98 is controlled by a spark advancer which advances or retards the spark ignition timing depending on engine operating conditions.

An exhaust system for the engine exhaust gas comprises an exhaust manifold 100, an exhaust duct 102, an exhaust gas purifier 104, a muffler 106 and a exhaust vent 108. The exhaust manifold 100 opens toward the engine cylinders to draw engine exhaust gas therefrom. The exhaust duct 102 communicates with the exhaust manifold 100 and includes the exhaust gas purifier 104 and the muffler 106. In the shown embodiment, the exhaust gas purifier 104 comprises a purifier housing 110 and a three-way catalytic converter 112 disposed within the purifier housing 110. The three-way catalytic converter 112 oxidizes monoxide carbon CO and hydrocarbons HC and reduces oxides of nitrogen $NO_x$.

An exhaust gas recirculation passage 114, which is referred hereinafter as the EGR passage is connected to the exhaust duct 102 upstream of the exhaust gas purifier 104. The EGR passage 114 communicates with the intake manifold 32 via an exhaust gas recirculation rate control valve 116 which is hereinafter referred as the EGR control valve. The EGR control valve 116 generally comprises a valve member 118 with a valve seat 120 which is provided at the end of the EGR passage 114 adjacent the intake manifold 32. The valve member 118 is incorporated with a vacuum actuator 122 and is cooperatively connected with a diaphragm 124 of the vacuum actuator 122 via a stem 126. The diaphragm 124 divides the interior of the vacuum actuator 122 into two chambers 128 and 130. The chamber 128 communicates with the EGR passage 114 via a passage 132 and the chamber 130 communicates with the regulating valve 68 via a control vacuum passage 134. A set spring 133 for biassing the diaphragm 124 is disposed within chamber 130. The control vacuum passage 134 is connected to a passage 136 connecting the vacuum chamber 66 with a chamber 138. One end of the passage 136 faces a valve member 140 secured on a diaphragm 142. A valve seat 143 is provided at the end of passage 136 to allow the valve member 140 to selectably seal passage 136. The valve member 140 has a stem portion 144 inserted into an electromagnetic actuator 146.

The duty cycle of the electromagnetic actuator 146 is controlled to move the valve member 140 with respect to the valve seat 143 in response to a control signal generated by a controller to be described later. According to the instantaneous position of the valve member 140, intake air is admitted to the passage 136 via the passage 86 at a controlled rate. The intake air admitted into the passage 136 is mixed with the intake vacuum admitted from intake passage 20 downstream of the throttle valve 30 via the vacuum induction passage 69 into the vacuum chamber 66, so as to produce the control vacuum. The control vacuum thus produced is conducted to the chamber 130 of the actuator 122 via the control vacuum passage 134 to control the operation of the EGR control valve 116. Thereby, the exhaust gas is admitted into the intake manifold at a controlled rate.

An air regulator 150 is provided near the throttle chamber 28 for regulating the intake air flowing through the throttle chamber. Also, a carbon canister 152 is provided. The carbon canister 152 retains hydrocarbon vapor until the canister is purged by air via the purge line 154 to the intake manifold when the engine is running. When the engine is idling, the purge control valve 156 is closed. Only a small amount of purge air flows into the intake manifold through the constant purge orifice. As the engine speed increased, and the ported vacuum raises higher, the purge control valve 156 opens and the vapor is drawn into the intake manifold through both the fixed orifice and the constant purge orifice. The carbon canister 152 can trap hydrocarbons due to the chemical action of the charcoal therein.

Figure 6B:
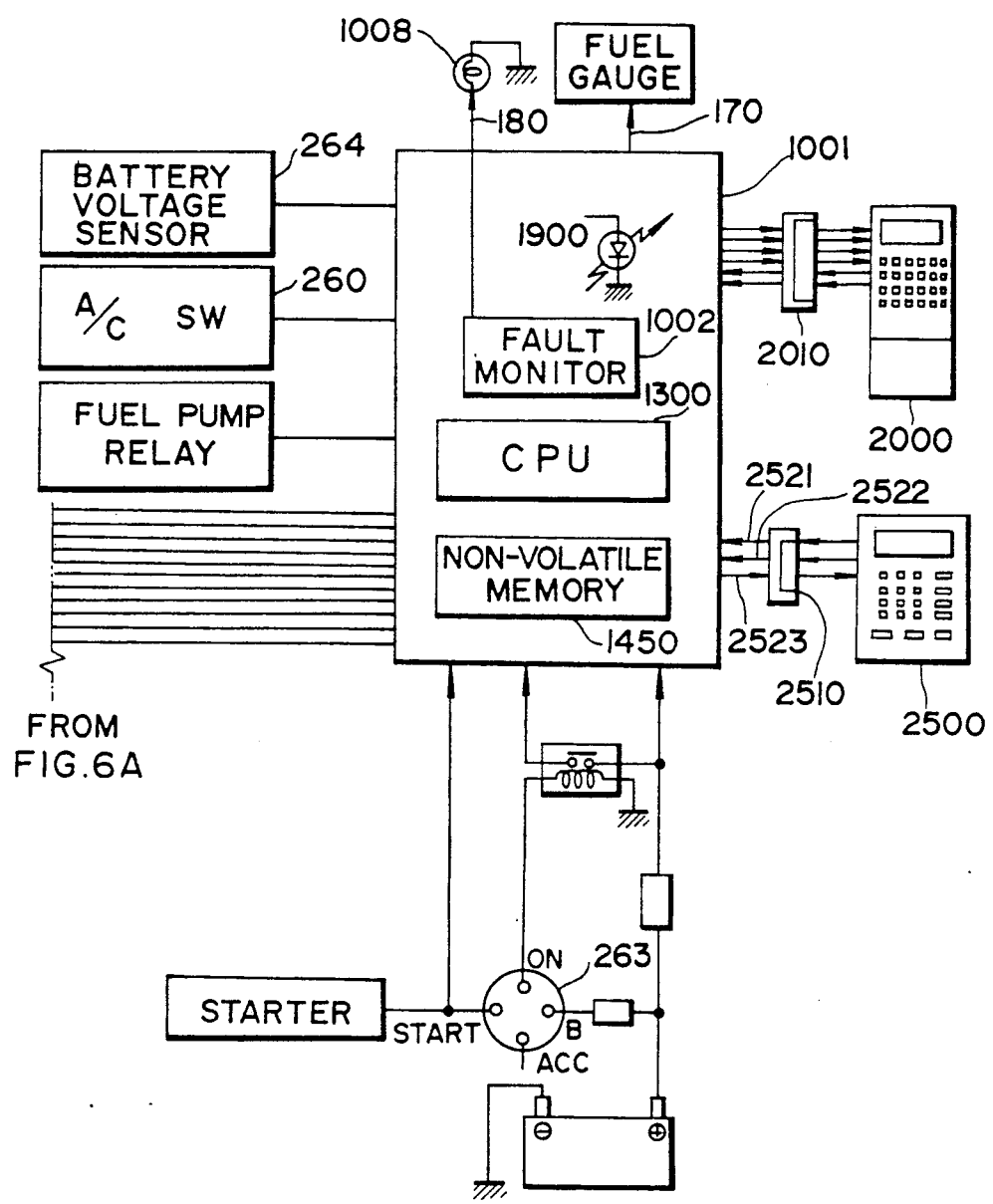

As shown in FIG. 6B, a controller 1001 generally comprises a microcomputer, including CPU 1300 and controls a fuel injection system, a spark ignition system, an EGR system and engine idling speed. The controller 1001 is connected to an engine coolant temperature sensor 220. The engine coolant temperature sensor 220 is usually disposed within a coolant chamber 222 in an engine cylinder block 224 in order to measure the engine coolant temperature. The engine coolant temperature sensor 220 produces an engine coolant temperature signal $T_w$ indicative of the measured engine coolant temperature. The engine coolant temperature signal $T_w$ is an analog signal with a voltage value proportional to the determined engine coolant temperature and is converted into a digital signal by a shaping circuit 1100 to adapt it for use by the digital controller 1001.

Generally speaking, the engine coolant temperature sensor 220 comprises a thermistor fitted onto a thermostat housing 226 provided in the coolant circulation circuit.

A crank angle sensor 230 is also connected to the controller 1001. The crank angle sensor 230 generally comprises a signal disc 232 secured to a crank shaft 234 for rotation therewith, and an electromagnetic pick-up 236. The crank angle sensor 230 produces a crank reference angle signal and a crank position angle signal. As is well known, the crank reference angle signal is produced when the engine piston reaches the top dead center and the crank position angle signal is produced per a given crank rotation angle, e.g., per 1 degree of crank rotation.

A transmission neutral switch 240 is connected to the controller 1001. The transmission neutral switch 240 is secured to the transmission 242 to detect the neutral position thereof and produces a neutral signal when the transmission is in the neutral position.

Also, a vehicle speed sensor 250 is connected to the controller. The vehicle speed sensor 250 is located near a vehicle speed indicator 252 and produces a pulse signal as a vehicle speed signal having a frequency proportional to the vehicle speed.

In the exhaust duct 102, there is provided an exhaust gas temperature sensor 256 in the exhaust gas purifier housing 210. The exhaust gas temperature sensor 256 determines the exhaust gas temperature and produces an analog signal as an exhaust gas temperature signal, which has a voltage value proportional to the determined exhaust gas temperature. The exhaust gas temperature signal is supplied to the controller 1001 via a multiplexer and analog-digital converter (not shown) in which the exhaust gas temperature signal is converted into a digital signal suitable for use by the microcomputer. The digital signal indicative of the exhaust gas temperature has a frequency corresponding to the voltage value of the exhaust gas temperature signal. On the other hand, an exhaust gas sensor 254 such as oxygen sensor, hereinafter simply referred as the O$_2$ sensor 254, is provided in the exhaust duct 102 upstream of the opening of the EGR passage 114. The O$_2$ sensor 254 determines the concentration of oxygen in the exhaust gas. The output of the O$_2$ sensor goes high when the determined oxygen concentation is more than the ratio 1:1 in relation to the other exhaust gas components and goes low when the oxygen concentration is less than the ratio 1:1. The output of the O$_2$ sensor is inputted to the microcomputer via the multiplexer and the analog-digital converter as a $\lambda$-signal.

Further, the air flow meter 26 is connected with the controller 1001. The rheostat 27 of the air flow meter 26 outputs an analog signal having a signal value proportional to the determined intake air flow rate. The throttle angle sensor 31 is also connected with the microcomputer to feed the outputs of the full throttle switch and the idle switch.

As shown in block form in the FIG. 6B, the controller 1001 LS further connected with an air-conditioner switch 260, a starter switch 262, an ignition switch 263 and a battery voltage sensor 264. The air-conditioner switch 260 turns on when the air-conditioner is in operative position. Also, the starter switch 262 is turned on when the starter is operating. The battery voltage sensor 264 determines the vehicle battery voltage and produces an analog signal having signal value proportional to the determined battery voltage. The battery voltage signal is fed to the microcomputer via the multiplexer and the analog-digital converter.

In the shown embodiment, the controller 1001 controls the fuel injection amount and timing, the spark ignition timing, EGR rate and engine idling speed.

The O$_2$ sensor signal from the O$_2$ sensor 254 is used to control the fuel injection quantity under stable engine conditions as determined with reference to the engine speed, the throttle valve angle position detected by the throttle angle sensor 31, the vehicle speed from the vehicle speed sensor 250 and so on. Under stable engine conditions, the fuel injection quantity is feedback controlled on the basis of the O$_2$ sensor signal so that the air/fuel ratio can be controlled to the stoichiometric value. This method of fuel injection control is called $\lambda$-control. If the engine is running under unstable conditions, the fuel injection quantity is generally determined on the basis of engine speed and intake air flow rate, the latter of which can be replaced by intake vacuum pressure downstream of the throttle valve. Under unstable engine conditions, the basic fuel injection quantity determined on the basis of engine speed and air flow rate is corrected according to other parameters such as the air-conditioner switch position, transmission gear position, engine coolant temperature and so on.

The spark ignition timing is generally controlled on the basis of engine speed, air flow rate, engine coolant temperature and so on, which effect to varying degrees the advance and retard of the spark advance.

The EGR control is effected on the basis of engine speed, engine coolant temperature, ignition switch position and battery voltage. Based on the engine speed and a basic fuel injection quantity determined according to engine speed and engine load, the recirculation rate of the exhaust gas is determined. The duty cycle of the EGR control valve is thus controlled in accordance with the determined recirculation rate.

The idle engine speed is controlled predominantly on the basis of engine coolant temperature and engine load condition. Under relatively cold engine conditions, the engine speed is maintained at a predetermined value, determined with reference to the engine coolant temperature, resulting in fast idle operation. In the normal temperature range, the engine speed is feedback-controlled on the basis of the difference between the actual engine speed and a reference engine speed determined on the basis of engine temperature, engine load condition and other parameters.

As shown in FIG. 6A and 6B, the controller 1001 also includes a fault monitor 1002. In practice, the fault monitor 1002 is a program stored in a memory and executed in a central processing unit (CPU). The controller 1001 is connectable with an external check unit 2000 via a check connector 2010. The check unit 2000 signals the controller 1001 to make the fault monitor operative in order to check a series of check items identified by inputs. The external check unit 2000 is illustrated in Japanese Patent Prepublication No. 56-141534 published Nov. 5, 1981. this patent is hereby incorporated by reference. The controller 1001 is also connected to the vehicle information system 2500 via a connector 2510.

The fault monitor 1002 of the controller 1001 is connected to a fault indicator via line 180. The fault monitor 1002 produces a fault signal S$_f$ when an error occurs in any one of the check items. The fault indicator turns on in response to the fault signal S$_f$ to indicate malfunction of the engine control system The fault monitor 1002 is associated with the non-volatile memory 1450 as set forth previously. Upon execution of the check program, check data from a series of check items are stored in the non-volatile memory 1450. When the fault indicator 1900 is turned on, the input unit 2540 (FIGS. 1 and 5) of the vehicle information system generates and outputs the read request command to the engine control system in order to read the check data out of the non-volatile memory 1450. On the basis of the retrieved check data, the vehicle information system 2500 feeds the fauit display signal to the display 2520 in order to identify the specific faulty segment and error condition on the display.

Figure 7:
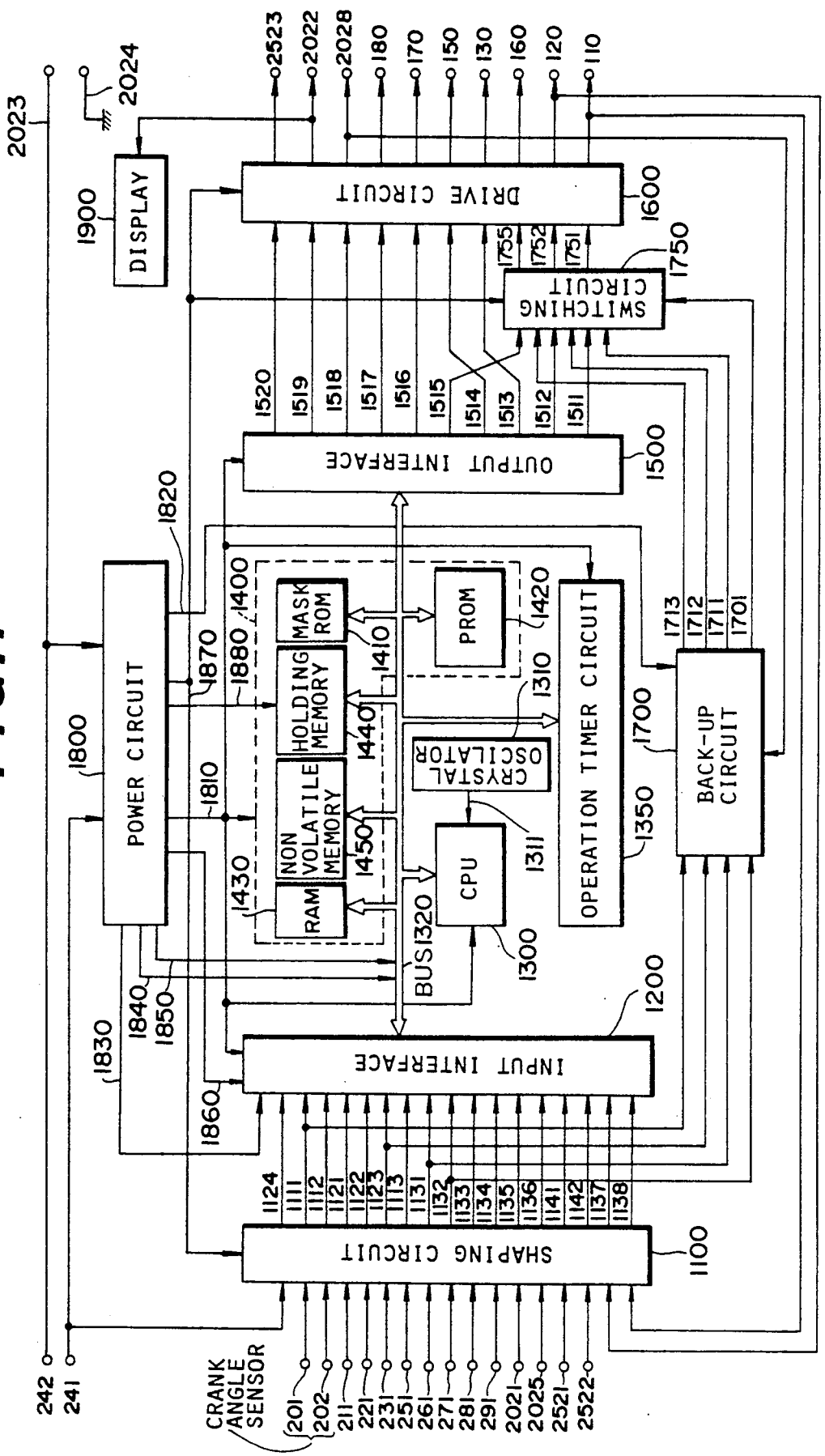
FIG. 7 is a block diagram of the electronic control system of FIG. 6.

FIG. 7 shows the detail of the controller 1001 of FIG. 6. The crank angle sensor 230, the vehicle speed sensor 250, the throttle angle sensor 31, the airconditioner switch 260, the transmission neutral switch 240, the starter switch 262, the ignition switch 263, the air flow meter 26, the engine coolant temperature sensor 220, the exhaust gas sensor 254, the exhaust gas temperature sensor 256, the battery voltage sensor 264 are all connected to an input interface 1200 of the digital controller 1001 via a signal shaping circuit 1100. The shaping circuit 1100 eliminates noise in the sensor signals, absorbs surge voltage and shapes respective sensor signals. The interface 1200 includes a crank reference signal counter, an engine speed counter, a vehicle speed counter and the above-mentioned multiplexer and analog-to-digital (A/D) converter. The crank reference signal counter and the engine speed counter are both connected to the crank angle sensor 230 to receive therefrom the crank reference angle signal and the crank position angle signal respectively. The vehicle speed counter is adapted to count the pulses of the vehicle speed sensor signal to produce a digital value representative of the vehicle speed. The air flow meter 26, the engine coolant temperature sensor 220, the exhaust gas sensor 254, the exhaust gas temperature sensor 256, the battery voltage sensor 264 all produce analog signals and are connected to the analog-to-digital converter so that the corresponding analog signals can be converted to corresponding digital signals suitable for use in the digital controller 1001.

The interface 1200 further includes a clock generator for controlling interface operations on a time-sharing basis, and a register for temporarily storing the inputted sensor signal values.

As usual, the digital controller 1001 includes a central processing unit (CPU) 1300, a memory unit 1400 including random access memory (RAM) 1430 and programmable read-only memory (PROM) 1420, and an output interface 1500. As shown in FIG. 7, the memory unit 1400 also includes the non-volatile memory 1450, a holding memory 1440 and a maskable ROM 1410. The CPU 1300 is connected to a clock generator including a crystal oscillator 1310 for controlling CPU operation on an incremental time basis. The CPU 1300 is also connected to each segment of the memory unit 1400, the register of the interface 1200 and the output interface 1500 via bus line 1320. The CPU 1300 executes programs stored in the maskable ROM 1410 and the PROM 1420 with input data read out from the register in the interface 1200. The results of execution of the programs are transferred to the output interface 1500 through the bus line 1320 for output.

As set forth previously, the maskable ROM 1410 holds predetermined programs and initial program data. The PROM 1420 also stores programs and program data which are chosen initially depending upon the model of the vehicle, the type of engine, etc. The RAM 1430 can renewably store data during execution of the programs and hold the results to be outputted. The contents of the RAM 1430 are cleared when power is turned off via the ignition switch. Temporary data to be stored even while the power is off are stored in the holding memory 1440. As stated previously, the non-volatile memory 1450 also stores data for the fault monitor. The contents of the non-volatile memory 1450 are maintained even if the ignition switch is turned off.

The controller 1001 also includes an operation timer circuit 1350 for controlling arithmetic operation, execution of programs and initiation of interrupts of the CPU. The operation timer 1350 includes a multiplyer for high-speed arithmetic operation, an interval timer for producing interrupt requests and a free-run counter which keeps track of the transition intervals between one engine control program and another in the CPU 1300 and the starting period of execution mode, so as to control the sequential execution of a plurality of control programs.

The output interface 1500 includes an output register which temporarily stores the output data and a signal generator which produces control signals either with duty cycles defining the results of execution of the control programs in the CPU 1300 or with on/off switching characteristics.

The signal generator of the output interface is connected to a drive circuit 1600. The drive circuit 1600 is a kind of amplifier for amplifying the output signals from the output interface and supplying the control signals to the actuators, such as fuel injectors 34, the actuator 94 for the idling speed control valve, and the actuator 146 for EGR control valve. The drive circuit 1600 is also connected to the display or indicator 1900 for fault indication, the external check unit 2000 and the vehicle information system 2500. The drive circuit 1600 is connected to the external check unit 2000 via the connector 2010 and data transmission lines 2023, 2022 and 2028. On the other hand, the drive circuit 1600 is connected to the vehicle information system 2500 via the connector 2510 and the data transmission lines 2521, 2522 and 2523.

A back-up circuit 1700 is connected to the shaping circuit 1100 to receive data therefrom. In practice, the back-up circuit 1700 is connected to data lines to receive the crank reference angle signal, the engine temperature signal, starter switch on/off signal and the throttle valve close signal. In turn, the back-up circuit 1700 is connected to the data lines 1755, 1752 and 1751 via data lines 1713, 1712, 1711 and 1701 and a switching circuit 1750 which is, in turn, connected to the output interface 1500 via data lines 1515, 1512 and 1511. On the other hand, the drive circuit 1600 is connected via the actuator line 2028 to the back-up circuit 1700. The back-up circuit 1700 is responsive to the fault indication signal from the drive circuit 1600 to produce a switching signal. The switching circuit 1750 normally establishes communication between the data lines 1513, 1512 and 1511 and the lines 1755, 1752 and 1751 for normal engine control operation. The switching circuit 1750 is responsive to the switching signal from the back-up circuit 1700 via the data line 1701 to connect the data lines 1713, 1712 and 1711 with the data lines 1755, 1752 and 1751 to control the fuel pump 260, the spark advancer 262 and the fuel injectors 34, respectively.

A power circuit 1800 is connected to a vehicle battery 262 via a power switch acting as a main power source to distribute power Vcc to the input interface 1200, CPU 1300, memory 1400, the output interface 1500 and so forth. The power circuit 1800 is also connected to the back-up circuit 1700. The power circuit 1800 produces a signal indicative of the ignition switch on/off positions and reset and halt signals for resetting the controller and temporarily disabling the controller 1001 respectively. The ignition on/off signal from the power circuit is fed to the input interface 1200 via a line 1830. On the other hand, the reset signal and the halt signal are fed to the bus-line 1320 via lines 1840 and 1850. The power circuit 1800 also supplies power to the input interface 1200, the shaping circuit 1100, the drive circuit 1600 and the switching circuit 1750 via lines 1860 and 1870. The power circuit 1800 is also connected to an auxiliary power source which bypasses the power switch to supply power to holding memory 1440 even when the main power switch is turned off.

Figures 8, 9:
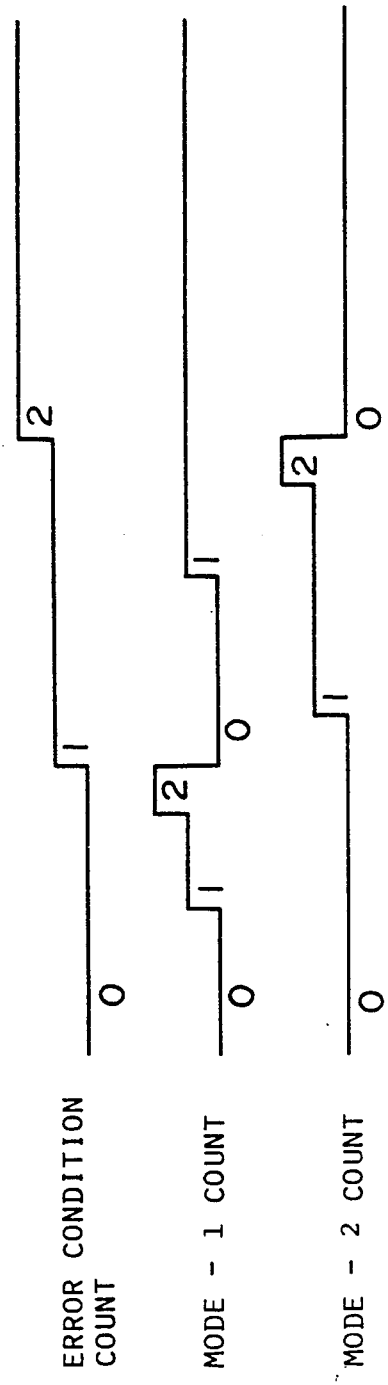
FIG. 8 is a chart of memory addresses used to store results of check operation in the self-monitoring system of FIG. 7.
FIG. 9 is a timing chart for the check result signals of the memory addresses of FIG. 8.

In the engine control system, the PROM 1420 stores various control programs for controlling engine operation. In addition, the PROM 1420 stores the check program for the fault monitor as one of its background jobs. The check program is executed whenever the CPU 1300 is not busy with the engine control programs. FIG. 8 shows a format for storing result data during execution of the check program in the non-volatile memory 1450. In the shown embodiment, each column of the non-volatile memory consists of 1 byte. Each column has sections 1451, 1452 and 1453 which indicate respectively a faulty segment, in 2 bits, or MODE-I section indicating broken wiring in 3 bits, or MODE-II section indicating shorting in 3 bits. The non-volatile memory 1450 has a plurality of addresses allocated in the above manner and each corresponding to one of the check items. The check result data in the non-volatile memory 1450 are read out in response to a request from the input unit 2540 of the vehicle information system 2500 to provide indication or display data to the vehicle information system. At the same time, if the fault is in some segment or segments, the fault signal is fed to the display or indicator 1900.

On the other hand, in order to check each check item, particularly for accurately checking input and output signals of the engine control system, it is necessary to eliminate the influence of noise created by various vehicle devices, such as the ignition system. Therefore, the duration of the checking operation for each checked item must be long enough to compensate for the influence of noise.

In the check program, the crank angle signals from the crank angle sensor 230, the engine coolant temperature signal from the engine coolant temperature sensor 220, the air flow meter signal from the air flow meter 26 and so forth are checked as input signals. On the other hand, the idle air control signal, the EGR control signal, the fuel injection control signal and so forth are checked as output signals. There are various ways to perform the checking of input and output signals. For example, the foregoing British Prepublication No. 2046964 discloses a check program for completely checking the electronic controller.

Figure 10:
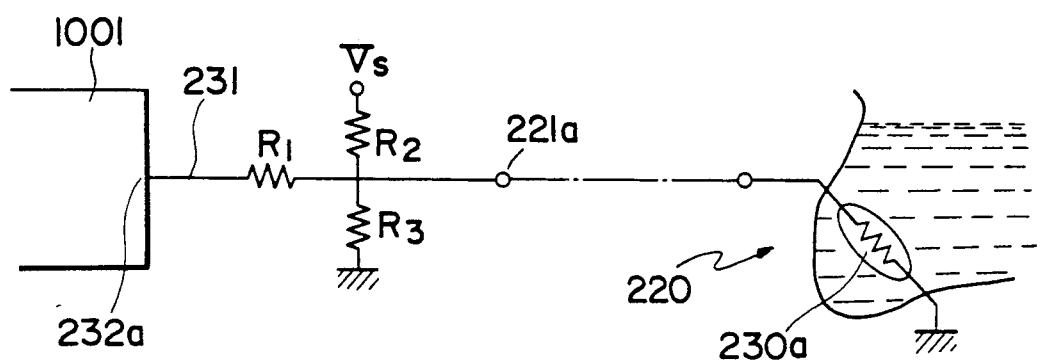
FIG. 10 is a schematic circuit diagram of an engine coolant temperature sensor in the electronic engine control system of FIG. 6.

As an example, the checking of the engine coolant temperature signal of the engine coolant temperature sensor will be described hereinbelow with reference to FIG. 9 to 11. As shown in FIG. 10, the engine coolant temperature sensor 220 comprises a thermistor 230a inserted in the engine coolant chamber 222 around the engine cylinder block 224. As is well known, the resistance value of the thermistor 230a acting as the engine coolant temperature sensor is variable in accordance with the engine coolant temperature. Therefore, by application of a constant voltage Vs to the thermistor 230a via divider resistors $R_1$, $R_2$ and $R_3$, the variation of the resistance value of the thermistor is reflected in the voltage at a terminal 221a. When the engine coolant temperature sensor 220 or the sensor circuit short-circuits, the output voltage at the terminal 221a becomes $O_V$. If the sensor or the sensor circuit breaks, a voltage $V_{max}$ which is derived from the constant voltage Vcc by the resistors $R_2$ and $R_3$ is applied at the terminal 221a. Therefore, if the voltage at the terminal 221a is maintained at $C_V$ or $V_{max}$ for a given period $t_3$ after cranking, shorting or breaking of the engine coolant temperature sensor or the sensor circuit is detected. In addition, it is impossible for the engine coolant temperature to change abruptly, e.g. to vary from +80° C. to −30° C. within a few seconds. Therefore, if such a significant change occurs in the sensor signal value, this can be easily recognized as an abnormal condition of the engine coolant temperature sensor or the sensor circuit. Furthermore, if the sensor signal value indicates an abnormal temperature range even after a relatively long warm-up period, it is possible that the sensor or the sensor circuit has shorted or broken.

In the execution of the engine coolant temperature sensor check program, the result of checking is inputted and stored in the non-volatile memory 1450 whenever the check program is executed. In the shown embodiment, the Memory bit-groups MODE-1 and MODE-2 are respectively adapted to store counts of shorting and breaking of the sensor or sensor circuit as described below. The stored counts in the areas of the non-volatile memory for storing MODE-1 and MODE-2 are incremented by one each time the abnormal signals are produced. The count in each of the bit-groups MODE-1 and MODE-2 is compared with a predetermined value. When the count in MODE-1 or MODE-2 reaches the predetermined value, the error condition group of two bits is incremented by one, as shown in FIG. 9.

The predetermined value to be compared with the count in MODE-1 and MODE-2 is determined depending on the characteristics and importance of the check item. In the case of the engine coolant temperature sensor, the sensor and sensor circuit consist of rather static elements which are not likely to produce an engine coolant temperature signal with an abnormal value. In addition, the temperature of the engine coolant can not vary abruptly. Therefore, in the shown embodiment, when the count in MODE-1 or MODE-2 reaches 2, the error counter address is incremented by 1 and the count of MODE-1 or MODE-2 is cleared, as shown in FIG. 9.

Figure 11:
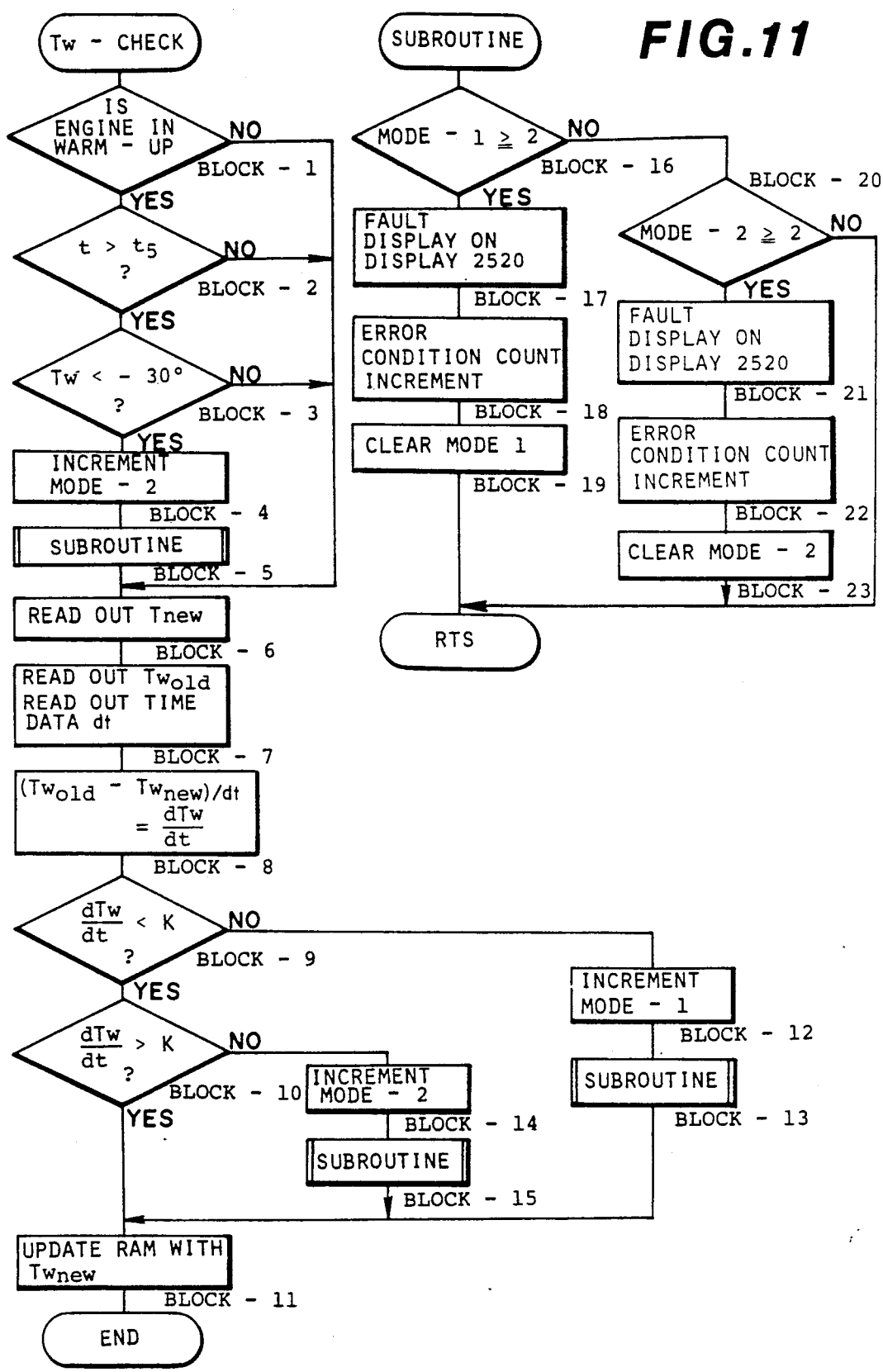
FIG. 11 is a flowchart of a engine coolant temperature sensor check program to be executed in the electronic engine control system.

Referring to FIG. 11, there is illustrated a check program for checking the engine coolant temperature sensor value. As set forth previously, the check programs are stored in PROM 1420 as background jobs for the controller. Therefore, the engine coolant temperature sensor check is carried out in a given order relative to the other check programs.

In BLOCK-1, immediately after starting execution, we check whether the engine is running. If the engine is running, the driving period t since cranking is compared with a predetermined period $t_5$ at BLOCK-2. If the driving period t exceeds the predetermined period $t_5$, then, the engine coolant temperature signal value $T_w$ is checked at BLOCK-3. If the engine coolant temperature signal $T_w$ is measured to be lower than −30° C., MODE-2 in the non-volatile memory 1450 is incremented by 1, at BLOCK-4. Thereafter, at BLOCK-5, the subroutine for an error count is executed. In this subroutine, the count of MODE-1 in the non-volatile memory 1450 is read out and compared with a reference value, i.e. 2, at BLOCK-16. If the count of MODE-1 is equal to the reference value, the fault signal is fed to the indicator or display 1900 for fault indication, at BLOCK-17. Thereafter, the error count area is incremented by 1, at BLOCK-18 and the count in the MODE-1 is cleared at BLOCK-19. If the result at BLOCK-16 is NO, then the count of MODE-2 is compared at BLOCK-20 to a reference value, i.e. 2. If the count of MODE-2 is equal to 2, the fault signal is produced to turn the indicator 1900 on at BLOCK-21. After this, as before, the error count area is incremented by 1 at BLOCK-22 and the count of the MODE-2 is cleared at BLOCK-23. After BLOCK-17 or BLOCK-23 or if the result at BLOCK-20 is NO, execution returns to main check program at BLOCK-6.

If any of decisions at BLOCK-1, BLOCK-2, or BLOCK-3 is NO, execution of the check program jumps to BLOCK-6. At BLOCK-6, the engine coolant temperature signal value $T_{wNEW}$ temporarily stored in the register 1214 of the interface 1200 is read out. Thereafter, the engine coolant temperature signal value $T_{wOLD}$ stored in the corresponding address in the RAM 1430 is read out and the time data (driving period) dt ($t_{new} - t_{old}$) is also read out from the RAM, at BLOCK-7. $t_{old}$ indicates the running time since the previous data was calculated, and $t_{new}$ indicates the running time (since cranking) at which the new data is taken. RAM 1430 is updated with the engine coolant temperature sensor signal value $T_{wNEW}$. Then, the value $$(T_{wOLD} - T_{wNEW})/dt = \frac{dT_w}{dt}$$

is calculated at BLOCK-8. The value of $dT_w/dt$ is compared to a reference value $+K$ at BLOCK-9. If it is smaller than $+K$, $dT_w/dt$ is then compared to a reference value $-K$ at BLOCK-10. If it is larger than $-K$, the engine coolant temperature signal value $T_{wOLD}$ in the RAM 1430 is updated with the engine coolant temperature signal value $T_{wNEW}$ in the register, at BLOCK-11.

If the result is NO in BLOCK-9, MODE-1 is incremented by 1 at BLOCK-12. Thereafter, the subroutine described above is executed at BLOCK-13. On the other hand, if the result in BLOCK-10 is NO, MODE-2 address is incremented by 1 at BLOCK-14. Then, the foregoing subroutine is executed at BLOCK-15.

After BLOCK-13 and BLOCK-15, execution of the check program proceeds to foregoing BLOCK-11.

Figure 12:
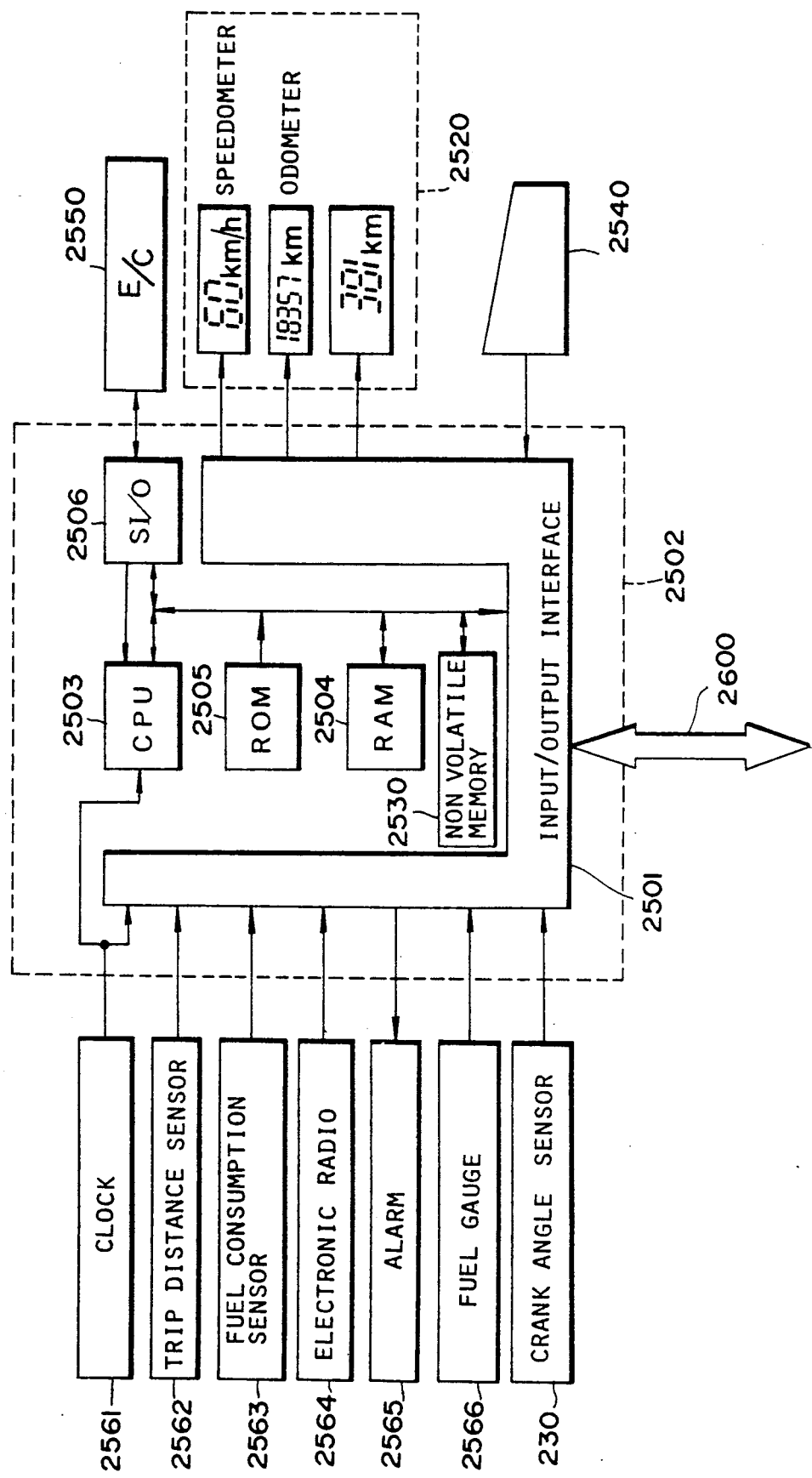
FIG. 12 is a schematic block diagram of the vehicle information system of FIG. 6.

Referring to FIG. 12, details of the vehicle information system 2500 in the preferred embodiment of FIG. 6 are shown. In the shown embodiment, the vehicle information system 2500 is adapted to display trip distance, average speed, deviation of the vehicle speed or trip distance from scheduled speed or distance for navigation, fuel consumption, trip distance per unit of fuel, which will hereafter be referred to as fuel economy indication, odometer indication, vehicle range with remaining fuel, engine revolution speed, and so on, on the display screen 2520. The display screen 2520 is also used to display a calculator for performing calculation and to display information concerning faulty segments of the engine control system. The vehicle information system also includes a radio controller for electronic tuning or pre-scheduling of radio programs and a vehicle clock with an alarm.

Therefore, the vehicle information system 2500 includes a clock 2561, a trip distance sensor 2562, a fuel consumption sensor 2563, an electronically controlled radio 2564 an alarm 2565, and a fuel gauge 2566 respectively connected to an input/output interface 2501. The input/output interface 2501 is also connected to the crank angle sensor 230 to receive the engine speed signals.

As in the foregoing engine control system, the vehicle information system includes a microcomputer 2502 comprising the input/output interface 2501, CPU 2503, RAM 2504, ROM 2505 and a non-volatile memory 2530. The interface 2501 is also connected to a keyboard 2540 serving as the input unit for controlling the display on the display screen 2520. The CPU 2503 is responsive to request signals from the keyboard 2540 to select the display mode on the display screen and selectably display the display items, such as the vehicle speed, the trip distance, the average speed, etc. The fuel consumption rate and remaining fuel supply can also be displayed. The measurement of the trip distance for indication of travel distance or fuel consumption rate is cleared everytime the data thereof is displayed.

The microcomputer 2502 is also connected to other systems such as the vehicle clock, vehicle radio tuner and so on, through a signal input/output interface 2506.

The input/output interface 2501 is further connected to the engine control system and controller 1001 via data transmission lines 2600. When the display or indicator 1900 (FIG. 6B) in the engine control system is turned on, the keyboard 2540 is enabled to input the read request command to the input/output interface 2501. As seen in FIG. 6, the read request command is transferred to the controller 1001 through the shaping circuit 1100 and the interface 1200 via the data transmission line 2521. In the controller, CPU 1300 is responsive to the read request command to read out fault data from the non-volatile memory 1450 to transfer the fault data to the input/output interface of the vehicle information system 2500 via the output interface 1500 and the data transmission line 2523. In the vehicle information system 2500, the fault data inputted is processed to identify the faulty segment and/or error condition of the faulty segment for display on the display screen 2520.

The faulty segment and the error condition thereof is thereby identified on the display screen 2520 in the form of a combination of several figures which are respectively representative of segments and error conditions. Although figures are used to identify the faulty segment and error condition in the shown embodiment, this can be done with corresponding symbols or words.

Figure 13:
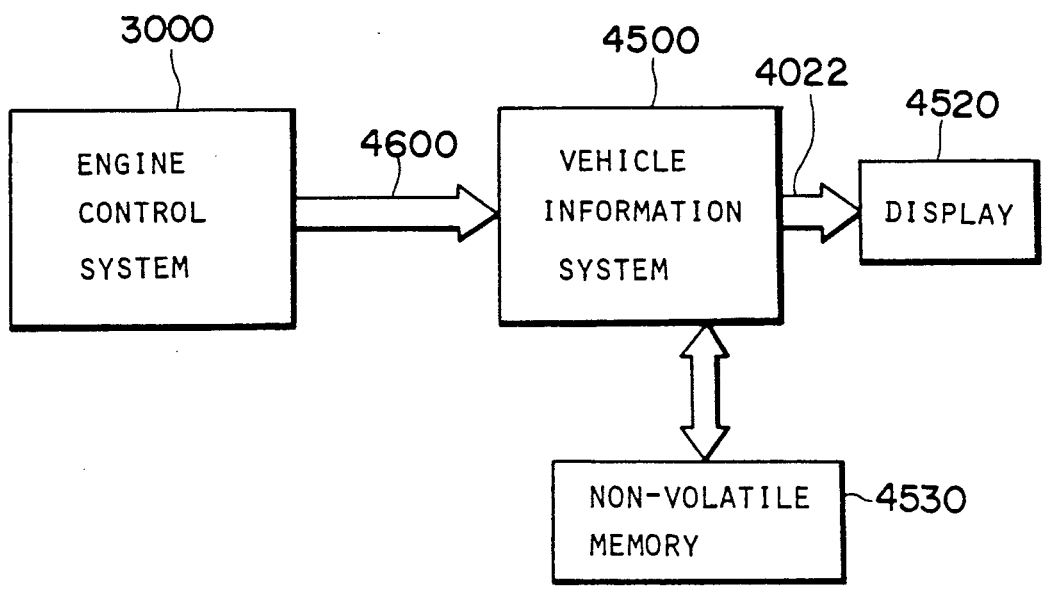
FIG. 13 is a schematic block diagram of the third embodiment the self-monitoring system of the present invention.

FIG. 13 shows a third embodiment of the automotive electronic device according to the present invention.

In the shown embodiment, the electronic device generally comprises an engine control system 3000 and a vehicle information system 4500 associated with each other. The engine control system 3000 includes various sensors and detectors such as an engine speed sensor, an air flow meter, and various temperature sensors, for providing control parameters, a control unit and actuators for controlling various engine operations such as fuel metering, idle airflow, spark ignition timing, as in the foregoing embodiments. On the other hand, the vehicle information system 4500 in the shown embodiment is adapted to compute travel distance, travel time, average vehicle speed and so on to provide information in relation to the current vehicle trip. The vehicle information system 4500 is associated with an external input unit, such as a keyboard, and a display 4520 for information display. The vehicle information system 4500 is also associated with a non-volatile memory 4530 for storing computed results. The engine control system 3000 further includes a fault monitor for detecting fault in the control system. The fault monitor checks the operation of a control unit in the control system and checks the inputs from the sensors as described previously. The result of the check operation by the fault monitor is fed to the non-volatile memory 4530 of the vehicle information system 4500. The check operation results are also fed to a display 4520 via a data line 4022 for control system fault indication.

As in the foregoing FIG. 1, the engine control system 3000 and the vehicle information system 4500 are connected to each other via a data transmission line 4600. The vehicle information system 4500 produces a read command when a read request is inputted to the input unit. The read command is fed to the engine control system to read the data from the non-volatile memory and output it to the input unit when the engine control system 3000 malfunctions.

The read data from the non-volatile memory is processed by the vehicle information system to identify the faulty sensors or elements in the engine control system. The vehicle information system 4500 sends a fault display signal indicative of the faulty element to the display 4520. In response to the fault display signal and depending on the fault display signal value, the display 4520 indicates the faulty sensor or element and the degree of error therein.

Figure 14:
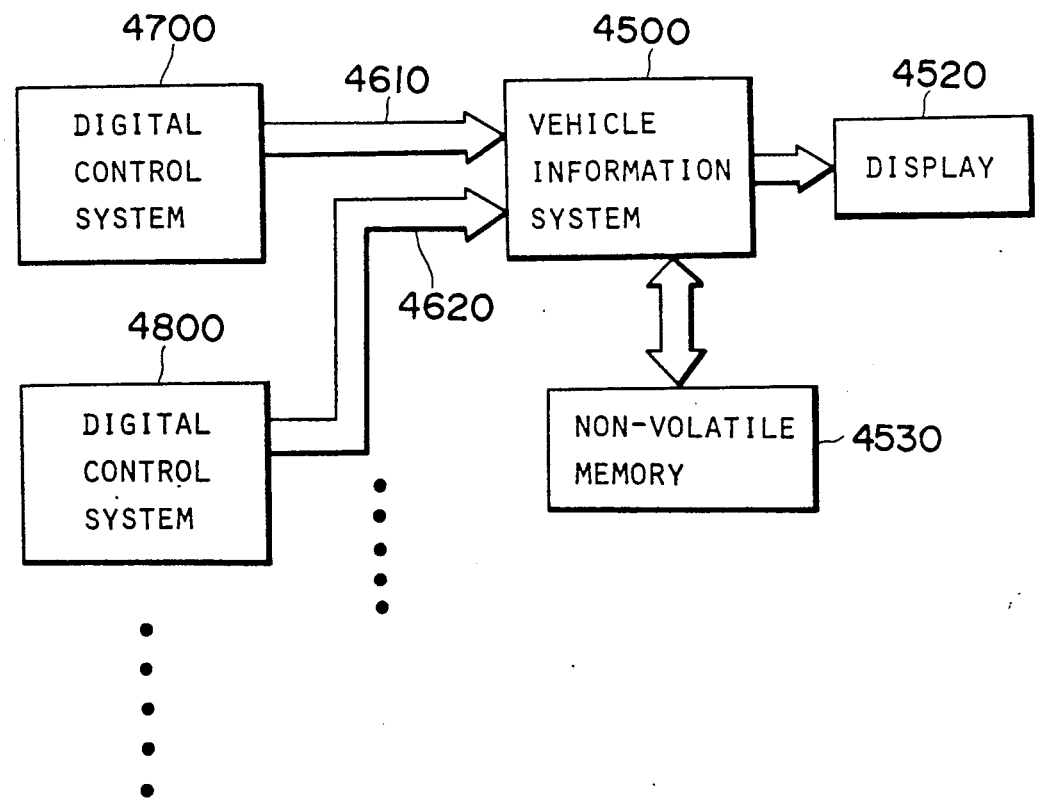
FIG. 14 is a schematic block diagram of the fourth embodiment of the self-monitoring system of the present invention.

Referring to FIG. 14, there is shown the fourth embodiment in which a plurality of digital or electronic control systems 4700, 4800 . . . are connected to the vehicle information system 4500. As shown in FIG. 5, respective digital control systems 4700, 4800 . . . are connected to the vehicle information system 4500 via respective data transmission lines 4610, 4620 . . . each having non-volatile memories. . . .

As in the foregoing first embodiment, each of the digital control systems 4700, 4800 . . . includes a fault monitor for detecting malfunction of the elements or segments thereof and producing a fault indication signal to be fed to the fault display 4520. The fault monitor also stores check data in the non-volatile memory 4530. This way, the fault display 4520 indicates which of the segments of the digital control systems are malfunctioning. An input unit is adapted to input a request for display of information about the faulty digital control system and errant segment in a manner similar to the foregoing first embodiment.

What is claimed is:

1. A self-monitor system for an automotive electronic control system, comprising:
    a first sensor sensing a relevant operational parameter relative to a vehicle component to be controlled by said electronic control system and producing a first sensor signal having a value representative of the sensed operational parameter;
    a second sensor sensing a relevant operational parameter relative to a vehicle operating condition and producing a second sensor signal having a value representative of the sensed vehicle operating condition;
    a first digital processor permanently mounted on said vehicle and responsive to said first sensor signal to derive a control signal for controlling operation of said vehicle component on the basis of said first sensor signal values, said first digital processor performing a self-checking checking program for checking operation of segments of said control system and said sensor and detecting faulty operation of each segment and sensor whenever failure occurs;
    a memory associated with said first digital processor for storing fault data including identification of the faulty segment;
    a second digital processor also permanently mounted on said vehicle and normally operable independently of said first digital processor and being responsive to said second sensor signal to derive information corresponding to said vehicle operating condition, said second digital processor having an external connector terminal for connection to said first digital processor through a data bus, a display unit, and a manually operable input device, said second digital processor further responsive to a check demand manually input through said input device to establish communication with said first digital processor to feed said demand to said first digital processor in order to trigger the latter for performing said self-checking program to said first digital processor and to display fault data stored in said memory on said display unit; and
    said second digital processor operative for receiving a plurality of vehicle operation parameters from a plurality of sensors and for processing same to provide output data to said display unit, said output data including vehicle trip and speed data selectively displayed in response to actuation of said input device.

2. The self-monitoring system as set forth in claim 1, wherein said input device of said second digital processor is a keyboard adapted for manual operation.

3. The self-monitoring system as set forth in any one of claims 1, or 2, wherein said memory is a non-volatile memory which is connected to first external terminals of said first digital processor to receive said fault data therefrom through a data bus connecting therebetween.

4. The self-monitoring system as set forth in claim 2, wherein said non-volatile memory is an external memory positioned external to said first digital processor.

5. The self-monitoring system as set forth in claim 2, wherein said non-volatile memory is incorporated in said second digital processor and responsive to said check demand to feed fault data stored therein to said display unit.

6. The self-monitoring system as set forth in claim 1, or 2, which further comprises a fault indicator which becomes active whenever failure of any segment is detected, said fault indicator incorporated with said first digital processor.

7. The self-monitoring system as set forth in claim 4, which further comprises a fault indicator which becomes active whenever failure of any segment is detected, said fault indicator included in said display unit of said second digital processor.

8. A fail-monitor system for an automotive engine control system, comprising:
    a first sensor for detecting an engine operating parameter and for producing a first sensor signal having a value indicative of the detected engine operating parameter;
    a plurality of additional sensors for detecting vehicle operating parameters and for producing a plurality of sensor signals having values indicative of the detected vehicle operating parameters;
    a first digital processor permanently mounted on said vehicle receiving said first sensor signal to derive a control signal for controlling operation of the engine based on the first sensor signal value, said first digital processor including a first external terminal and operative for performing self-monitoring program for detecting a failure of the sensor and for producing a fault signal, said first digital processor further detecting failure of segments of said control system during the control operation to produce said fault signal;
    a memory associated with said first digital processor and responsive to said fault signal for storing fault data including identification of the faulty segment;
    a second digital processor also permanently mounted on said vehicle and normally operable independently of said first digital processor, said second digital processor having an external terminal connected to said first external terminal of said first digital processor through a bus line, a manually operable input device and a display unit, said manually operable input device for inputting a check command upon manual operation thereof, said second digital processor responsive to said check command to feed a demand to said first digital processor for executing said self-monitoring program, and said second digital processor responsive to a display command input through said input device for displaying on said display unit the result of said self-monitoring program and fault data stored in said memory; and said second digital processor operative for receiving a plurality of said vehicle operation parameters from said plurality of sensors and for processing same to provide output data to said display unit, said output data including vehicle trip and speed data selectively displayed in response to actuation of said input device.

9. The fail-monitor system as set forth in claim 8, wherein said memory is a non-volatile external memory connected to said first digital processor through a second external terminal of said first digital processor and a data bus, said memory being responsive to said fault signal to accept write-in of fault data and responsive to said display command to allow reading out of the stored fault data.

10. The fail-monitor system as set forth in claim 9, which further comprises a fault indicator associated with said first digital processor and responsive to said fault signal to be active for indicating failure of the control system.

11. The fail-monitor system as set forth in claim 10, wherein said first sensor detects one of an engine coolant temperature, a load condition on the engine, a revolution speed of the engine, an oxygen concentration in the exhaust gas, a temperature of the exhaust gas, crank shaft angular position, transmission gear position and a vehicle speed.

12. The fail-monitor system as set forth in claim 11, wherein said second digital processor performs operations to provide information relative to vehicle condition including travelling distance, travelling time and average speed.

13. The fail-monitor system as set forth in claim 12, wherein said second digital processor has a second external terminal connected to said memory for reading out the stored fault data when said display command is input through said input device.

14. A self-monitor system for an automotive electronic control system, comprising:

a first sensor sensing a relevant operational parameter relative to a vehicle component to be controlled by said electronic control system and producing a first sensor signal having a value representative of the sensed operational parameter;

a second sensor for sensing a relevant vehicle operational parameter relative to a vehicle operating condition and producing a second sensor signal having a value representative of the sensed vehicle operating condition;

a first digital processor permanently mounted on said vehicle and responsive to said first sensor signal to derive a control signal for controlling operation of said vehicle component on the basis of said first sensor signal values, said first digital processor performing a self-checking program for checking operation of segments of said control system and said sensor and detecting faulty operation of each segment and sensor whenever failure occurs;

a memory associated with said first digital processor for storing fault data including identification of the faulty segment; and a second digital processor also permanently mounted on said vehicle and normally operable independently of said first digital processor and being responsive to said second sensor signal to process said vehicle operating condition to provide output data, said second digital processor having an external connector terminal for connection to said first digital processor through a data bus, a display unit, and a manually operable input device, said second digital processor further responsive to a check demand manually input through said input device to feed said demand for performing said self-checking program to said first digital processor and to display fault data stored in said memory on said display unit.

15. A fail-monitor system for an automotive engine control system, comprising:

a first sensor for detecting an engine operating parameter and for producing a first sensor signal having a value indicative of the sensed engine operating parameter;

a second sensor for detecting a vehicle operating parameter and for producing a second sensor having a value indicative of the sensed vehicle operating parameter;

a first digital processor permanently mounted on a vehicle receiving said first sensor signal to derive a control signal for controlling operation of the engine based on the first sensor signal value, said first digital processor including a first external terminal and operative for performing self-monitoring program for detecting a failure of the sensor and for producing a fault signal, said first digital processor further detecting failure of segments of said control system during the control operation to produce said fault signal;

a memory associated with said first digital processor and responsive to said fault signal for storing fault data including identification of the faulty segment; and a second digital processor also permanently mounted on said vehicle and normally operable independently of said first digital processor and being responsive to said second sensor signal to process said vehicle operating condition to provide output data, said second digital processor having an external terminal connected to said first external terminal of said first digital processor through a bus line, a manually operable input device and a display unit, said manually operable input device for inputting a check command upon manual operation thereof, said second digital processor further responsive to said check command to feed a demand to said first digital processor for executing said self-monitoring program, and said second digital processor responsive to a display command input through said input device for displaying on said display unit the result of said self-monitoring program and fault data stored in said memory.

16. A self monitor system for an automotive electronic system, comprising:

a first sensor sensing a relevant operational parameter relative to a vehicle component to be controlled by said electronic control system and producing a first sensor signal having a value representative of the sensed operational parameter;

a second sensor sensing a relevant operational parameter relative to a vehicle operating condition and producing a second sensor signal having a value representative of the second vehicle operating condition;

a first digital processor permanently mounted on a vehicle and responsive to said first sensor signal to derive a control signal for controlling operation of said vehicle component on the basis of said first sensor signal values, said first digital processor performing a self-checking program for checking operation of segments of said control system and said sensor and detecting faulty operation of each segment and sensor whenever failure occurs;

a memory associated with said first digital processor for storing fault data including identification of the faulty segment; and a second digital processor also permanently mounted on a vehicle and having an interface for external connection of at least a manually operable input unit and a display, said second digital processor being also interfaced with said first digital processor for data communication therebetween, said second digital processor normally performing preset operations independently of said first digital processor including being responsive to said second sensor signal to process said vehicle operating condition to provide output data, and said second digital processor further responsive to a check demand manually input through said input device to establish communication with said first digital processor to feed said demand to said first digital processor in order to trigger the latter for performing said self-checking program to said first digital processor and to display fault data stored in said memory on said display unit thereof.

17. A self-monitor system for an automotive electronic system, comprising:

a first sensor sensing a relevant operational parameter relative to a vehicle component to be controlled by said electronic control system and producing a first sensor signal having a value representative of the sensed operational parameter;

a second sensor sensing a relevant operational parameter relative to a vehicle operating condition and producing a second sensor signal having a value representative of the sensed vehicle operating condition;

a first digital processor permanently mounted on a vehicle and responsive to said first sensor signal to derive a control signal for controlling operation of said vehicle component on the basis of said sensor signal values, said first digital processor performing a self-checking program for checking operation of segments of said control system and said sensor and detecting faulty operation of each segment and sensor whenever failure occurs;

a memory associated with said first digital processor for storing fault data including identification of the faulty segment; and a second digital processor also permanently mounted on a vehicle and having an interface for external connection to at least a manually operable input unit and a display, said second digital processor being also interfaced with said first digital processor for data communication therebetween, said second digital processor normally performing preset operations independently of said first digital processor for data communication therebetween, said second digital processor normally performing preset operations independently of said first digital processor in response to manual input through said input unit including being responsive to said second sensor signal to process said vehicle operating condition to provide output data, and said second digital processor further responsive to a check demand manually input through said input device to establish communication with said first digital processor to feed said demand to said first digital processor in order to trigger the latter for performing said self-checking program to said first digital processor and to display fault data stored in said memory on said display unit thereof.

18. A self-monitor system for an automotive electronic system, comprising:

a first sensor sensing a relevant operational parameter relative to a vehicle component to be controlled by said electronic control system and producing a first sensor signal having a value representative of the sensed operational parameter;

a second sensor sensing a relevant operational parameter relative to a vehicle operating condition and producing a second sensor signal having a value representative of the sensed vehicle operating condition;

a first digital processor permanently mounted on a vehicle and responsive to said first sensor signal to derive a control signal for controlling operation of said vehicle component on the basis of said first sensor signal values, said first digital processor performing a self-checking program for checking operation of segments of said control system and said first sensor and detecting faulty operation of each segment and sensor whenever failure occurs;

a memory associated with said first digital processor for storing fault data including identification of the faulty segment; and a second digital processor also permanently mounted on a vehicle and having an interface for external connection to at least a manually operable input unit and a display, said second digital processor being also interfaced with said first digital processor for data communication therebetween, said second digital processor normally performing preset operations including display processing said vehicle operating condition for deriving vehicular driving information and control for displaying said vehicular driving information including mileage as triggered through said input unit independently of said first digital processor, and said second digital processor responsive to a check demand manually input through said input device to establish communication with said first digital processor to feed said demands to said first digital processor in order to trigger the latter for performing said self-checking program to said first digital processor and to display fault data stored in said memory on said display unit thereof.

19. A self-monitor system for an automotive electronic system, comprising:

a first sensor sensing a relevant operational parameter relative to a vehicle component to be controlled by said electronic control system and producing a first sensor signal having a value representative of the sensed operational parameter;

a second sensor sensing a relevant operational parameter relative to a vehicle operating condition and producing a second sensor signal having a value representative of the sensed vehicle operating condition;

a first digital processor permanently mounted on a vehicle and responsive to said first sensor signal to derive a control signal for controlling operation of said vehicle component on the basis of said first sensor signal values, said first digital processor performing a self-checking program for checking operation of segments of said control system and said sensor and detecting faulty operation of each segment and sensor whenever failure occurs;

a memory associated with said first digital processor for storing fault data including identification of the faulty segment; and a second digital processor also permanently mounted on a vehicle and having an interface for external connection to at least a manually operable input unit and a display, said second digital processor being also interfaced with said first digital processor for data communication therebetween, said second digital processor normally performing preset operations governing display of vehicular driving information, which, is derived by processing said vehicle operating condition in response to said second sensor signal, at least including vehicular speed data independently of said first digital processor in response to manual input through said input unit, and said second digital processor responsive to a check demand manually input through said input device to establish communication with said first digital processor to feed said demand to said first digital processor in order to trigger the latter for performing said self-checking program to said first digital processor and to display fault data stored in said memory on said display unit thereof.

20. A self-monitor system for an automotive electronic system, comprising:

a first sensor sensing a relevant operational parameter relative to a vehicle component to be controlled by said electronic control system and producing a first sensor signal having a value representative of the sensed operational parameter;

a second sensor sensing a relevant operational parameter relative to a vehicle operating condition and producing a second sensor signal having a value representative of the sensed vehicle operating condition;

a first digital processor permanently mounted on a vehicle and responsive to said first sensor signal to derive a control signal for controlling operation of said vehicle component on the basis of said first sensor signal values, said first digital processor performing a self-checking program for checking operation of segments of said control system and said sensor and detecting faulty operation of each segment and sensor whenever failure occurs;

a memory associated with said first digital processor for storing fault data including identification of the faulty segment; and a second digital processor also permanently mounted on a vehicle and having an interface for external connection to at least a manually operable input unit and a display, said second digital processor being also interfaced with said first digital processor for data communication therebetween, said second digital processor normally performing preset operations governing operation of vehicular electric equipment under control of a manually input command through said input unit independently of said first digital processor in response to manual input through said input unit and being responsive to said second sensor signal to process said vehicle operating condition to provide output data, and said second digital processor responsive to a check demand manually input through said input device to establish communication with said first digital processor to feed said demand to said first digital processor in order to trigger the latter for performing said self-checking program to said first digital processor and to display fault data stored in said memory on said display unit thereof.

* * * * *